US012606063B2

(12) United States Patent

Ravlic et al.

(10) Patent No.: US 12,606,063 B2

(45) Date of Patent: Apr. 21, 2026

(54) CHILD RESTRAINT

(71) Applicant: Britax Römer Kindersicherheit GmbH, Leipheim (DE)

(72) Inventors: Tomislav Ravlic, Neusaess (DE); Stefan Suessmann, Elchingen (DE); Tobias Krones, Koetz (DE); Michael Wirth, Neu-Ulm (DE); Issam Moujib, Munich (DE)

(73) Assignee: Britax Römer Kindersicherheit GmbH, Leipheim (DE)

( * ) Notice: Subject to any disclaimer, the term of this patent is extended or adjusted under 35 U.S.C. 154(b) by 145 days.

(21) Appl. No.: 18/606,818

(22) Filed: Mar. 15, 2024

(65) Prior Publication Data

US 2024/0317120 A1 Sep. 26, 2024

(51) Int. Cl.
*B60N 2/28* (2006.01)

(52) U.S. Cl.
CPC ......... *B60N 2/2806* (2013.01); *B60N 2/2816* (2023.08)

(58) Field of Classification Search
CPC .... B60N 2/2806; B60N 2/2816; B60N 2/286; B60N 2/2863; B60N 2/2812
See application file for complete search history.

(56) References Cited

U.S. PATENT DOCUMENTS 7,140,571 B2   11/2006  Hishon et al.
7,901,003 B2    3/2011  Meeker et al.
8,322,788 B2 * 12/2012  Williams ............. B60N 2/2821
                              297/256.16
8,950,809 B2 *  2/2015  Szakelyhidi ......... B60N 2/2806
                              297/256.16
8,973,991 B2    3/2015  Wuerstl
9,315,124 B2 *  4/2016  Lehman ............... B60N 2/2806
(Continued)

FOREIGN PATENT DOCUMENTS

AU      2018217211 A1   2/2019
CN       201566585 U   9/2010
(Continued)

OTHER PUBLICATIONS

2 Pack Car Seat Tools Make You More Comfortable, Leonir, https://www.nepal.ubuy.com/en/product/4E7OXIN5C-car-seat-belt-adjuster-2-pack-seatbelt-clips-universal-comfort-shoulder-neck-protector-strap-positioner-lock-clips-for-adults-kids-pregnant-women; last downloaded Mar. 13, 2024; 4 pages.
(Continued)

*Primary Examiner* — Justin M Benedik
(74) *Attorney, Agent, or Firm* — K&L Gates LLP

(57) ABSTRACT

A child seat comprising a seat body comprising a seat portion and a backrest portion. The seat body is configured to receive a belt, with a shoulder section and a lap section, of the vehicle seat in an untensioned state. A tensioning mechanism comprising a clamping member pivotally attached with respect to the seat body, the clamping member is rotatable between a first and second position. Placing the clamping member in the second position allows the seat body to receive the belt of the vehicle seat, and movement of the clamping member from the second position to the first position presses a portion of the clamping member against both the shoulder section and the lap section of the belt such that a portion of the shoulder section and the lap section are displaced by the clamping member to secure the child seat to the vehicle seat in a tensioned configuration.

10 Claims, 9 Drawing Sheets

(56) References Cited

U.S. PATENT DOCUMENTS

| | | | | |
|---|---|---|---|---|
| 9,499,074 | B2 * | 11/2016 | Strong | B60N 2/286 |
| 10,023,079 | B2 * | 7/2018 | Zhao | B60N 2/2851 |
| 10,336,219 | B2 | 7/2019 | Mason | |
| 10,406,947 | B2 | 9/2019 | Anderson et al. | |
| 10,696,192 | B2 | 6/2020 | Harmes et al. | |
| 10,737,593 | B1 * | 8/2020 | Shellenberger | B60N 2/2845 |
| 10,953,774 | B2 * | 3/2021 | Maciejczyk | B60N 2/2809 |
| 11,155,187 | B2 * | 10/2021 | Anderson | B60N 2/2821 |
| 12,122,269 | B2 * | 10/2024 | Mchugh | B60N 2/2863 |
| 2011/0140491 | A1 * | 6/2011 | Williams | B60N 2/2806 |
| | | | | 297/256.16 |
| 2018/0345827 | A1 * | 12/2018 | Anderson | B60N 2/2806 |
| 2021/0370807 | A1 * | 12/2021 | Zhao | B60N 2/763 |
| 2023/0039629 | A1 * | 2/2023 | Mchugh | B60N 2/2851 |
| 2023/0045293 | A1 | 2/2023 | Mchugh | |
| 2024/0116410 | A1 | 4/2024 | Oltman | |
| 2024/0116411 | A1 | 4/2024 | Erel Caglar | |
| 2024/0116412 | A1 | 4/2024 | Oltman | |
| 2024/0166098 | A1 | 5/2024 | Larrison | |
| 2024/0166101 | A1 | 5/2024 | Mchugh | |
| 2024/0286534 | A1 | 8/2024 | Heisey | |

FOREIGN PATENT DOCUMENTS

| | | | |
|---|---|---|---|
| CN | 103003096 | A | 3/2013 |
| CN | 203995790 | U | 12/2014 |
| CN | 113071388 | A | 7/2021 |
| KR | 200458152 | Y1 | 2/2011 |
| NL | 9201526 | A | 4/1994 |
| WO | WO2022152868 | A1 | 7/2022 |
| WO | WO2023052633 | A1 | 4/2023 |

OTHER PUBLICATIONS

2pcs Baby Child Car Seat Safety Belt Clip Buckle Toddler Safe Strap Fixed Lock, https://megadealmart.com/baby/car-seats-accessories/accessories/2pcs-baby-child-car-seat-safety-belt-clip-buckle-toddler-safe-strap-fixed-lock/?gclid= Cj0KCQjwkOqZBhDNARIsAACsbfJD8P-JK6whcReSHyUsTT4O 2Z1jioyWvjrbFAU2VIMHB5T5ziiAhflaApMOEALw_wcB, last downloaded Mar. 13, 2024; 2 pages.
European Patent Office Search Report filed in EP 23162928.8.

\* cited by examiner

CHILD RESTRAINT

PRIORITY CLAIM AND CROSS-REFERENCE TO RELATED APPLICATIONS

The present application claims the benefit of European Patent Application No. 23162928.8, filed Mar. 20, 2023, the contents of which are hereby incorporated by reference in their entirety.

TECHNICAL FIELD

The present disclosure relates to a child safety restraint.

BACKGROUND

Child restraints are configured to be installed within a vehicle and may be held in place by a vehicle seat belt typically having a shoulder portion and a lap portion. The child restraint may also be held in place using an alternate means, such as a soft latch system having a belt that connects to anchor points built into the vehicle's structure. In the event of an accident, the seat belt or soft latch system will prevent, or at least reduce movement of the child restraint relative to the vehicle.

In some forms a child restraint is in the form of a child seat, where the child seat may be installed within the vehicle and held in place by the vehicle seat belt or soft latch system. In other forms, the child restraint may be in the form of a child seat connected with respect to a seat base, where the seat base is installed within the vehicle and held in place by the vehicle seat belt or soft latch system.

In order to ensure that the child safety seat or seat base is correctly installed in the vehicle, it is necessary for the installer to correctly engage the vehicle seat belt or soft latch belt with the child safety seat or seat base, and to ensure that any remaining slack is removed from the vehicle seat belt or soft latch belt, such that in the event of an accident, movement of the child safety seat or seat base relative to the vehicle is reduced.

In many instances, the end user of the child safety seat or seat base will not have the strength or dexterity to remove the remaining slack from the vehicle seat belt or soft latch belt prior to use, resulting in a sub-optimal installation of the child safety seat or seat base.

It is against this background that the present disclosure has been developed.

SUMMARY

According to a first aspect, there is provided a child restraint configured to be secured to a vehicle seat, the child restraint comprising a restraint body configured to receive a belt in an untensioned state, and a tensioning mechanism comprising a clamping member pivotally attached with respect to a portion of the restraint body, wherein the clamping member is rotatable between a first position substantially adjacent to the restraint body and a second position displaced therefrom, wherein placing the clamping member in the second position allows the restraint body to receive the belt, and movement of the clamping member from the second position to the first position presses a portion of the clamping member against the belt such that a portion of the belt is displaced by the clamping member to secure the child restraint to the vehicle seat in a tensioned configuration, characterised in that the tensioning mechanism further comprises a locking member pivotally attached with respect to the clamping member, the locking member comprising a pair of projections configured to engage with corresponding apertures formed in the restraint body to secure the clamping member in the first position.

In one form, the clamping member comprises a first end and a second end, wherein the first end of the clamping member is pivotally attached with respect to the restraint body, and the second end is configured to pivotally attach with respect to the locking member.

In one form, the clamping member has been moved to its first position, the locking member can be rotated from an unlocked position, toward a locked position, such that projections engage with the corresponding apertures.

In one form, each projection and aperture comprise a corresponding stop surface, and wherein the locking member will reach the locked position when the stop surface of each projection bears against the corresponding stop surface provided within each aperture.

In one form, each aperture comprises first and second ramped surfaces separated by a transition region, and wherein each projection comprises a contact portion configured to come into contact with and bear against the first and second ramped surfaces as the locking portion is rotated toward and away from the locked position, wherein the first ramped surface is configured to resist rotation of the locking member as the locking member is rotated toward the locked position and the second ramped surface is configured to resist rotation of the locking member as the locking member is rotated away from the locked position.

In one form, the restraint body is in the form of a child seat comprising a seat portion and a backrest portion.

In one form, the clamping member further comprises a first surface and a second surface, wherein when the clamping member is in the first position, the first surface of the clamping member forms a continuous seating surface for an occupant of the child seat, and a portion of the second surface of the clamping member is configured to bear against a portion of the belt.

In one form, the restraint body is in the form of a seat base configured to receive a child seat.

In one form, the belt is a vehicle seat belt.

In one form, the belt comprises a shoulder section and a lap section and movement of the clamping member from the second position to the first position presses a portion of the clamping member against either or both of the shoulder section or the lap section of the belt such that a portion of either or both of the shoulder section or the lap section are displaced by the clamping member.

In one form, the belt is for a soft latch system.

BRIEF DESCRIPTION OF DRAWINGS

Embodiments of the present invention will be discussed with reference to the accompanying drawings wherein.

DESCRIPTION OF EMBODIMENTS

Figure 1:
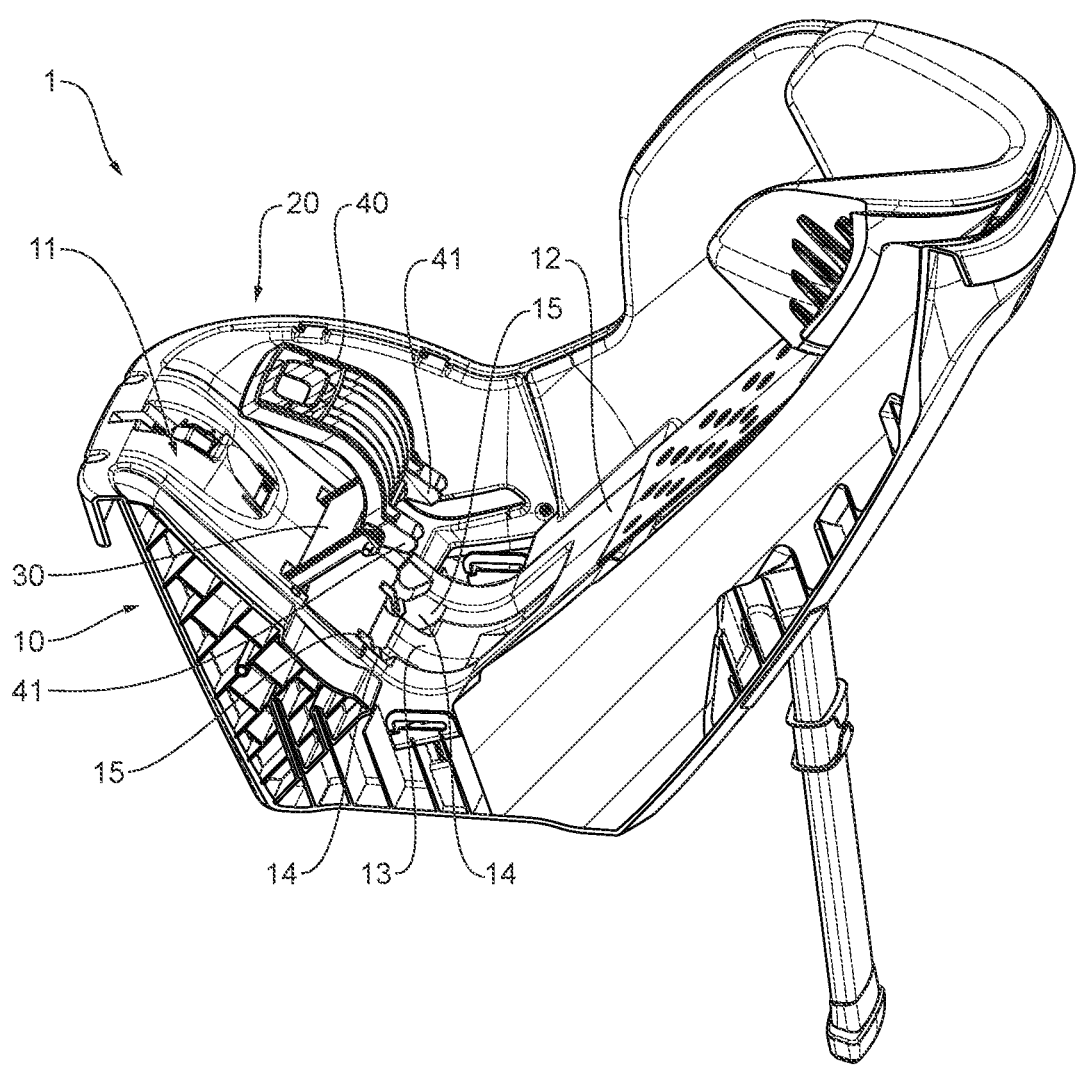
FIG. 1 is a partial perspective view of a child seat, according to an embodiment, showing a clamping member in a second position, ready for receiving a belt.

Referring now to FIG. 1, there is shown a child restraint 1 configured to be secured to a vehicle seat, the child restraint 1 comprising a restraint body 10 configured to receive a belt in an untensioned state, and a tensioning mechanism 20 comprising a clamping member 30 pivotally attached with respect to a portion of the restraint body 10, wherein the clamping member 30 is rotatable between a first position substantially adjacent to the restraint body 10 and a second position displaced therefrom, wherein placing the clamping member 30 in the second position allows the restraint body 10 to receive the belt, and movement of the clamping member 30 from the second position to the first position presses a portion of the clamping member 30 against the belt such that a portion of the belt is displaced by the clamping member 30 to secure the child restraint 1 to the vehicle seat in a tensioned configuration, wherein the tensioning mechanism 20 further comprises a locking member 40 pivotally attached with respect to the clamping member 30, the locking member 40 configured to engage with a portion of the restraint body 10 to lock the clamping member 30 in the first position.

In the embodiment shown, it can be seen that the child restraint 1 is in the form of a child seat, where the restraint body 10 is in the form of a seat body 10, comprising a seat portion 11 and a backrest portion 12. It will also be appreciated that the child restraint may also be in the form of a child seat and seat base, where the restraint body 10 is in the form of a seat base configured to receive a child seat.

Figure 2:
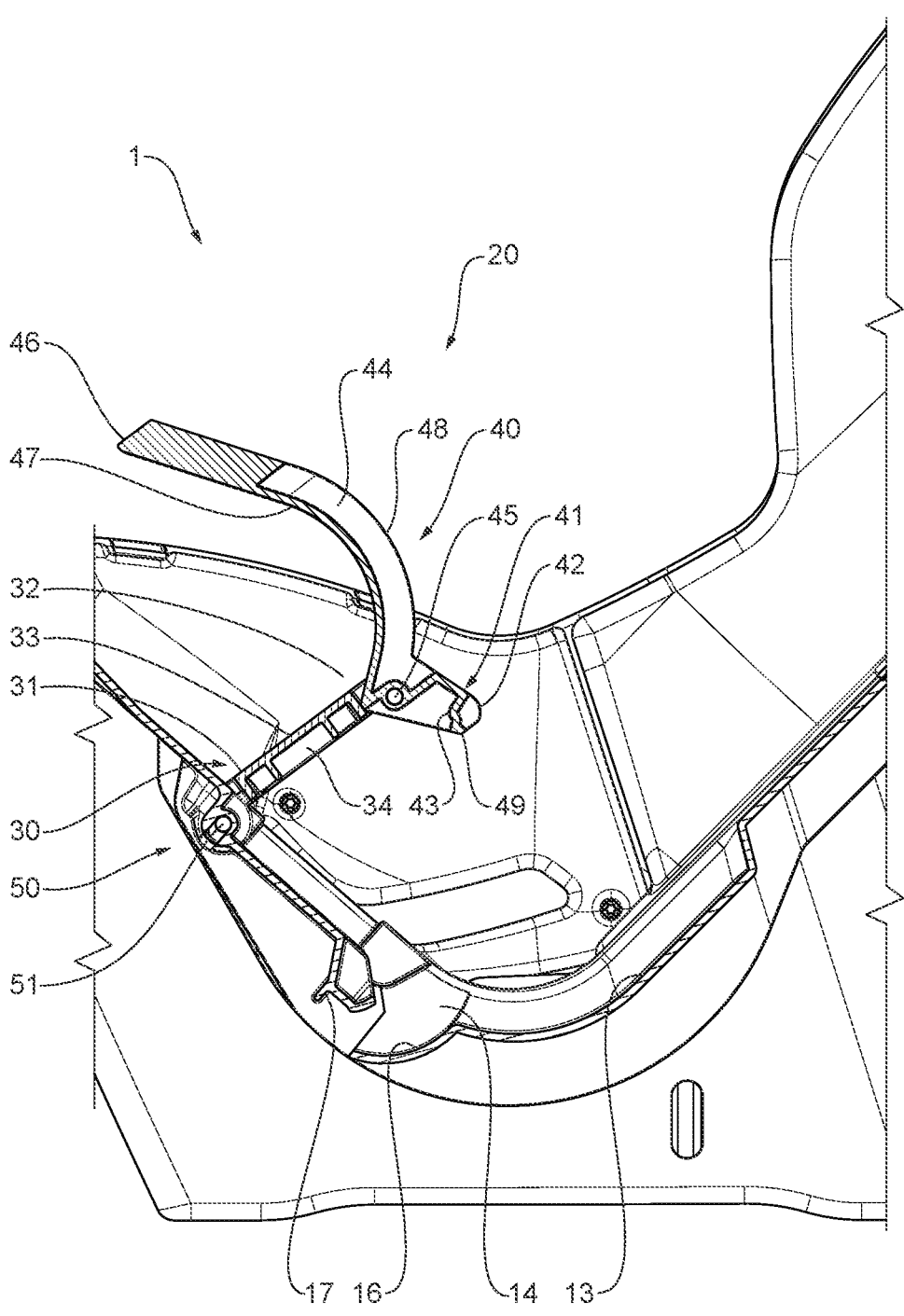
FIG. 2 is a sectional view of the child seat of FIG. 1, showing the clamping member in the second position.
Figure 3:
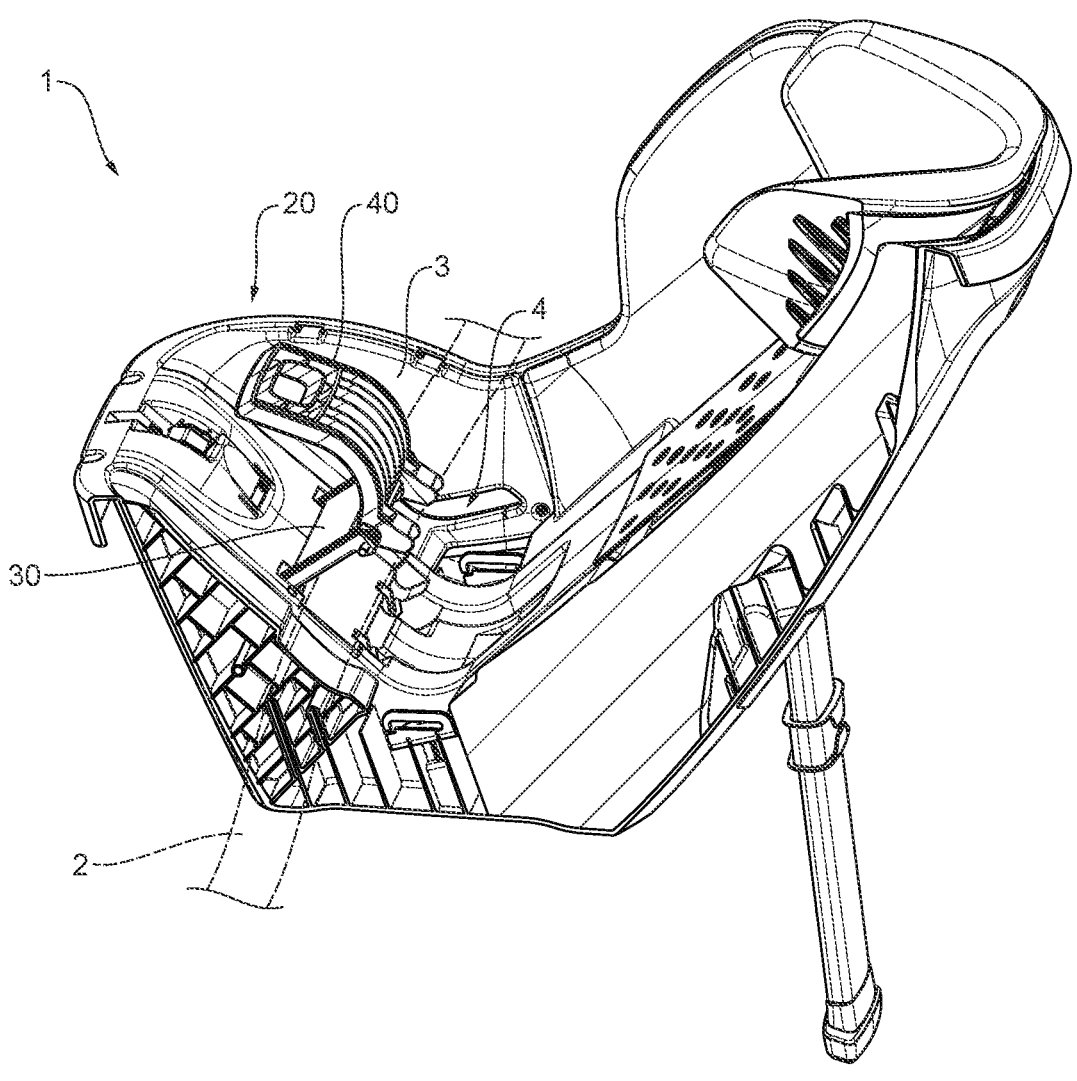
FIG. 3 is a partial perspective view of the child seat of FIG. 1, showing the clamping member in the second position, and a belt having been positioned along the belt path.

With reference to FIG. 2, it can be seen that the clamping member 30 comprises a first end 31 and a second end 32, wherein the first end 31 of the clamping member 30 is configured to pivotally attach with respect to the seat body 10, and the second end 32 is configured to pivotally attach with respect to the locking member 40. The clamping member 30 also comprises a first, upper surface 33 and a second, lower surface 34. It will be appreciated that when the clamping member 30 is in the first position, the upper surface 33 of the clamping member 30 forms part of a continuous seating surface for the occupant, and a portion of the lower surface 34 of the clamping member 30 is configured to bear against a portion of the belt. It will be appreciated that in some circumstances, the belt 2 may be in the form of a vehicle seat belt and may comprise a shoulder section and a lap section, and movement of the clamping member 30 from the second position to the first position presses a portion of the clamping member 30 against either or both of the shoulder section or the lap section of the vehicle seat belt such that a portion of either or both of the shoulder section or the lap section are displaced by the clamping member 30. It will also be appreciated that in some circumstances, the vehicle seat belt may comprise a lap section only, and movement of the clamping member 30 from the second position to the first position presses a portion of the clamping member 30 against the lap section of the vehicle seat belt such that a portion of the lap section is displaced by the clamping member 30. In other circumstances the belt 2 is part of a soft latch system, where the belt 2 carries two anchor latches configured to connect to respective anchor points built into the vehicle's structure. The soft latch system will typically feature one or more adjustment mechanisms that allows the length of the belt between the two anchor latches to be adjusted, thereby allowing excess belt to be withdrawn. In one form, a portion of the belt for the soft latch system may be secured with respect to the child restraint via a tether arrangement, and may be stowed within or on the child restraint when not in use and moved into position with respect to the tensioning mechanism when in use. In other forms, the soft latch system would be a separate component that is not secured with respect to the child restraint.

Figure 8:
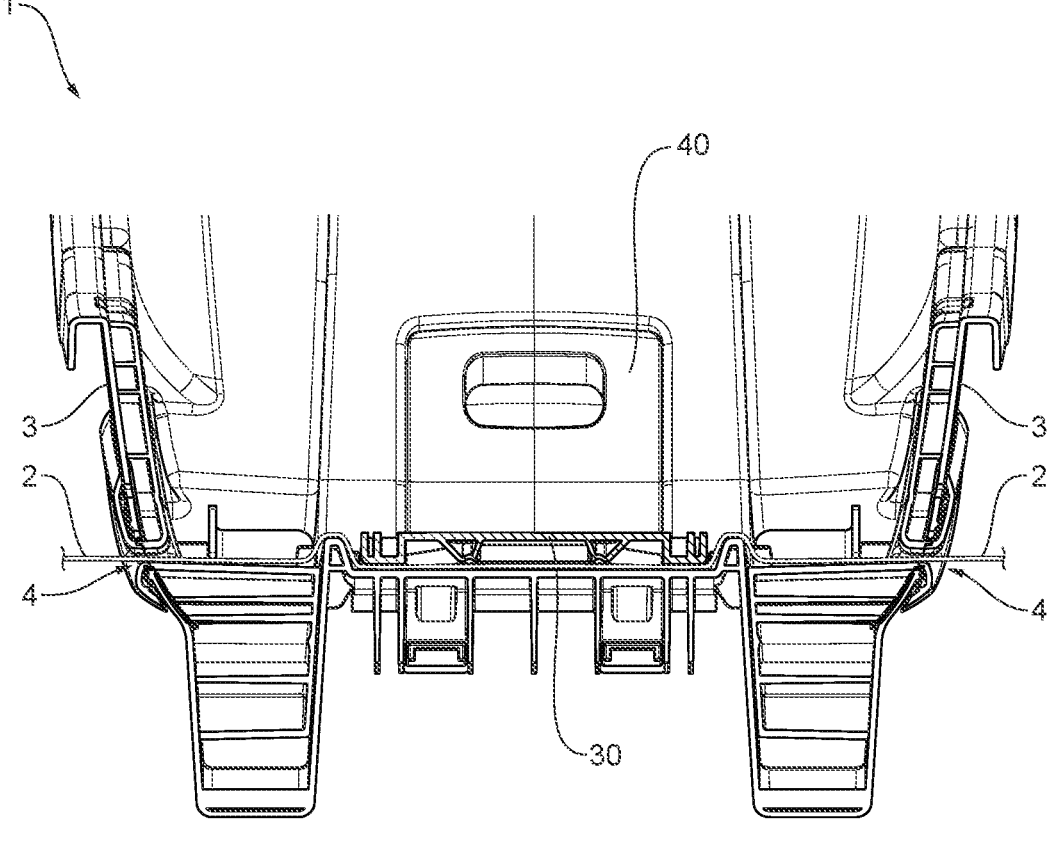
FIG. 8 is a sectional view of the child seat of FIG. 1, detailing the belt path when the clamping member is in the first position and the locking member locked.

With reference to FIG. 8, it can be seen how the clamping member 30 interacts with the seat body 10 and the belt 2 to increase the effective path of travel of the belt 2 when the clamping member 30 is in its first position. It will be appreciated that the increase in the effective path of travel of the belt 2 will draw more of the belt within the seat body 10, which will remove slack from the belt 2 and have the effect of pulling the child seat 1 against the vehicle seat.

It will further be appreciated that as the clamping member 30 is moved to the first position, the belt 2 is put under tension and there is a consequent reaction force from the belt 2 pushing back up on the clamping member 30. It will be appreciated that once the clamping member 30 is in the first position, the locking member 40 is able to be rotated toward a locked position where it engages with a portion of the seat body. It will further be appreciated that as the locking member is rotated toward the locked position, the upward force will continue to act on the clamping member. By virtue of the fact that the locking member is rotatably connected with respect to the clamping member, this upward force will also act on the locking member.

It can be seen that the locking member 40 comprises a pair of projections 41 configured to engage with a pair of corresponding apertures 14 formed in the seat body 10. For the purposes of this description, the relationship between a corresponding projection 41 and aperture 14 will now be described in singular form, however it will be appreciated that any number of projections and corresponding apertures may be provided.

Figure 4:
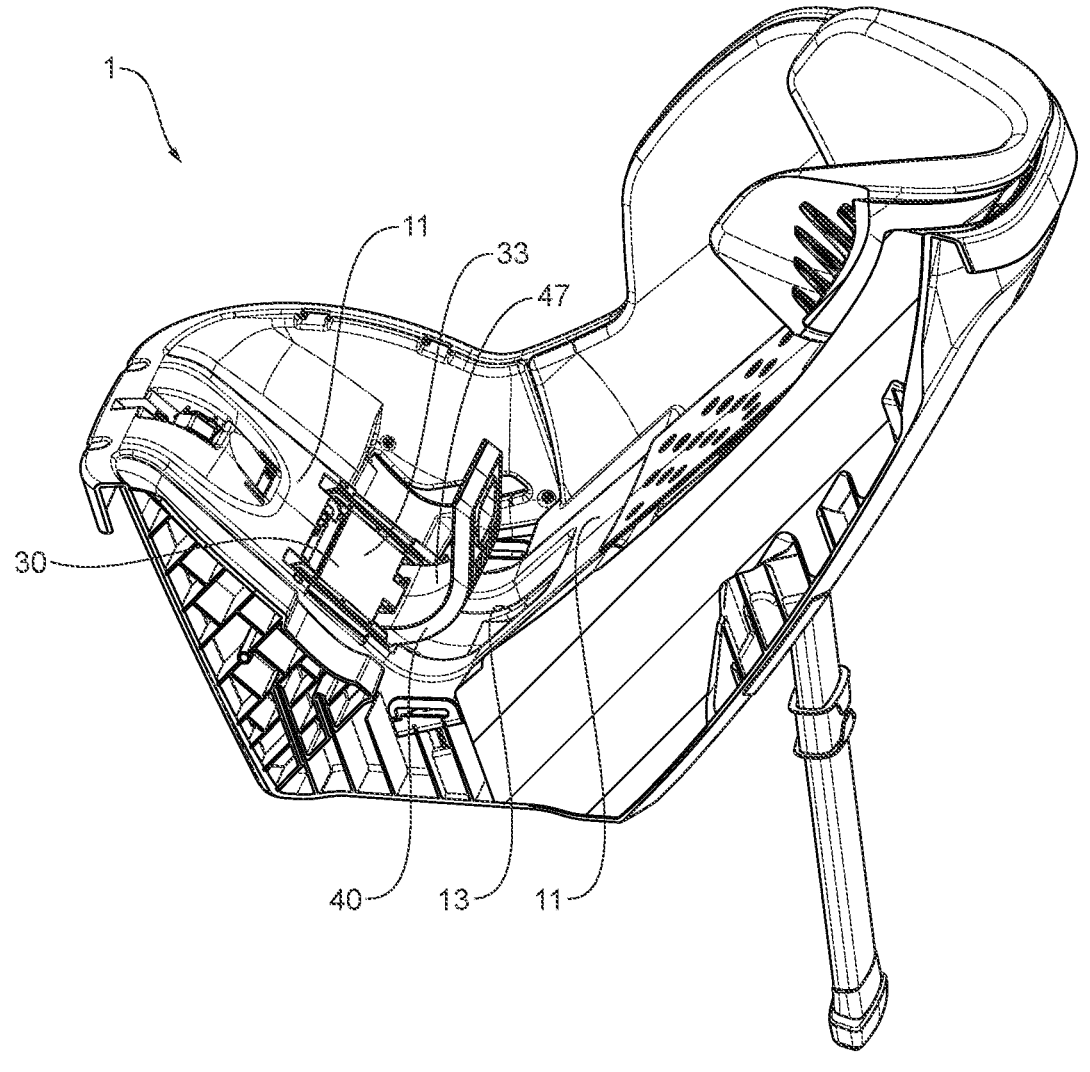
FIG. 4 is a partial perspective view of the child seat of FIG. 1, showing the clamping member in a first position, with the locking member unlocked.
Figure 5:
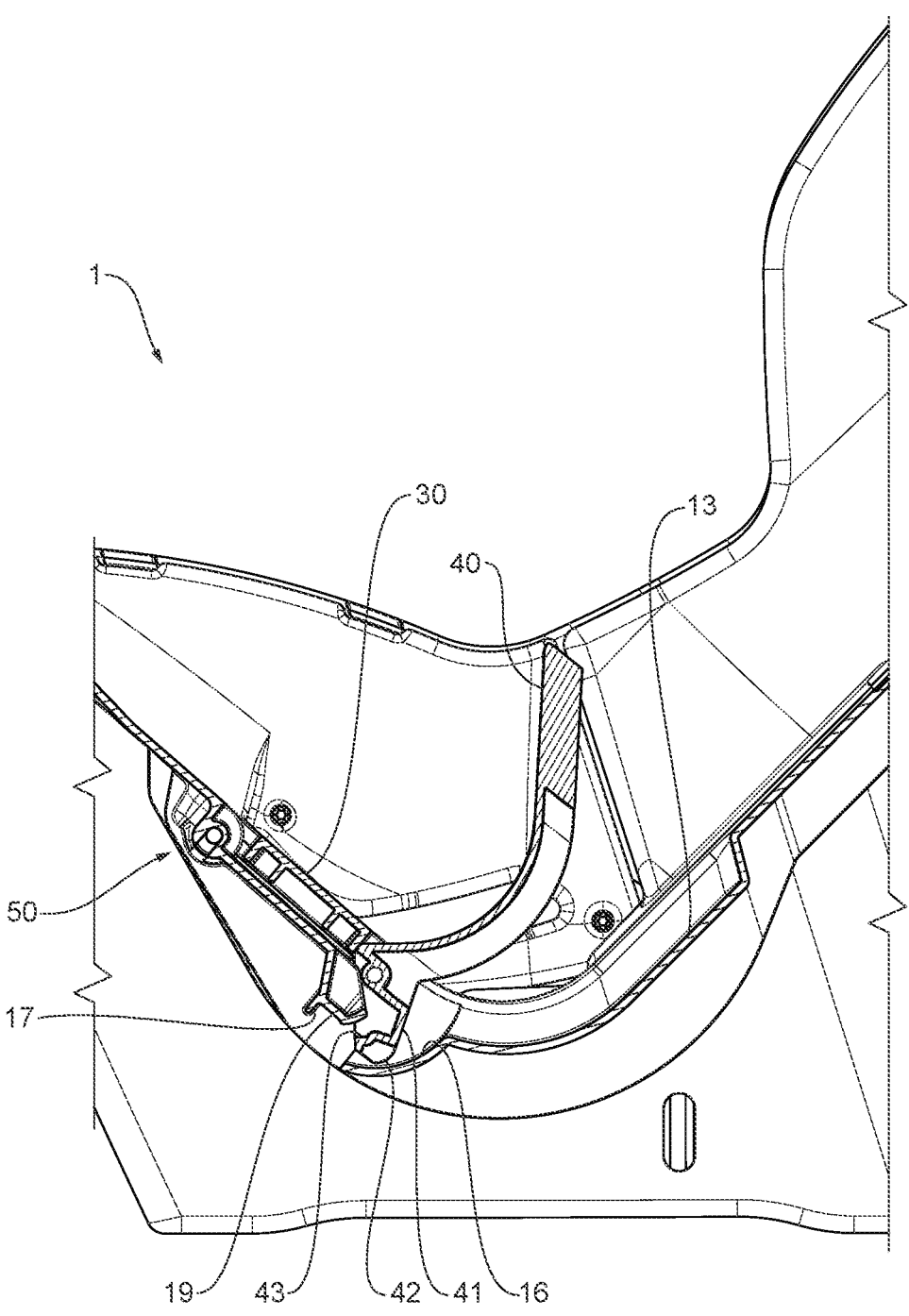
FIG. 5 is a sectional view of the child seat of FIG. 1, showing the clamping member in a first position, with the locking member unlocked.

With reference to FIGS. 4 and 5, when the clamping member 30 has been moved to its first position, the locking member 40 can then be rotated toward the locked position where the projection 41 begins to move into an opening in its respective aperture 14. The aperture 14 features a first bearing surface 16 against which an outer surface 42 of the projection 41 is configured to bear against as the locking member 40 enters the aperture opening and is rotated toward the locked position.

Figure 9:
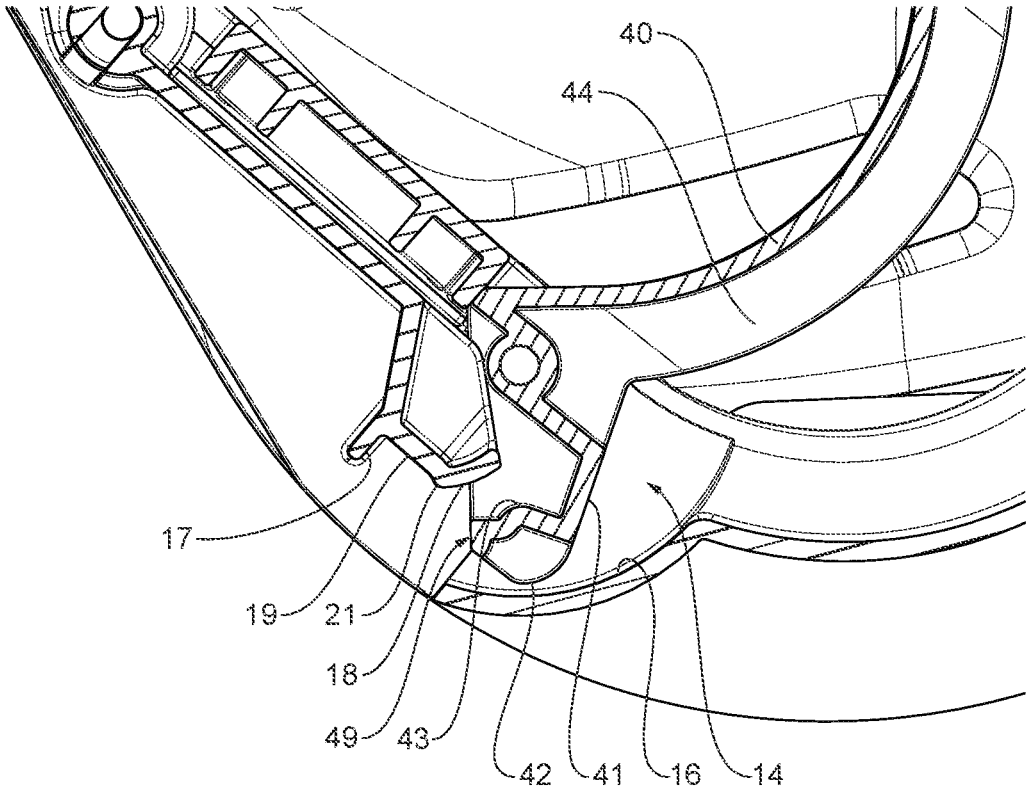
FIG. 9 is a sectional view of the child seat of FIG. 1, detailing features of the locking member projections and their corresponding apertures.

With reference to FIG. 9, it can be seen that the aperture 14 features first and second ramped surfaces, 18, 19 separated by a transition region 21, and a stop surface 17. It can also be seen that the projection 41 features a contact portion 43 and a stop surface 49. The locking member 40 will reach the locked position when the stop surface 49 on the projection 41 bears against the corresponding stop surface 17 provided within the aperture 14. The purpose of the first and second ramped surfaces 18, 19 and the contact portion 43 will be described in further detail below.

As the locking member 40 continues to be rotated toward the locked position, the contact portion 43 provided on the projection 41 comes into contact with and bears against the first ramped surface 18 provided in the aperture 14. The first ramped surface 18 is configured to resist rotation of the locking member 40 as the contact portion 43 of the projection 41 slides against it toward the locked position. Once the contact portion 43 has passed over the transition region 21, the second ramped surface 19 is configured to not resist (or offer less resistance) to rotation as the projection 41 moves toward the locked position. It will be appreciated that the decreased resistance and the upward force acting on the locking member 40 from the belt 2 will cause the locking member 40 to continue to rotate to the locked position once the contact portion 43 of the projection 41 passes the transition region 21.

It will be appreciated that the opposite occurs when the locking member 40 is rotated away from the locked position, where the second ramped surface 19 of the aperture 14 will resist rotation of the locking member 40 as the contact portion 43 of the projection slides against it, and then once the contact portion 43 has passed over the transition region 21, the first ramped surface 18 is not configured to resist rotation. It will again be appreciated that the decreased resistance and the upward force acting on the locking member 40 from the belt 2 will cause the locking member 40 to continue to rotate away from the locked position once the contact portion 43 of the projection 41 passes the transition region 21.

It can also be seen that the locking member 40 comprises a first section 44 in the form of a lever, configured to be actuated by a user when operating the tensioning mechanism 20. It can be seen that the first section 44 comprises a first end 45 configured to be rotatably connected to the second end 32 of the clamping member 30, and from which the pair of projections 41 extend. The first section 44 also comprises a second end 46 opposite to the first end 45 and the projections 41, and a first, upper surface 47 and second lower surface 48. It will be appreciated that when in the locked position the upper surface 47 of the locking member 40 forms part of the continuous seating surface for the occupant, and a portion of the lower surface 48 of the locking member 40 is configured to bear against a portion of the backrest portion 12 of the seat body 10.

It can also be seen that the backrest portion 12 has a recessed portion 13 into which the locking member 40 locates when in its locked position, ensuring the continuous seating surface when the occupant is seated. The recessed portion 13 is sized such that a user wanting to unlock the tensioning mechanism 20 can fit their fingers behind a portion of the second end 46 of the first section 44 of the locking member 40, in order to pull the locking member 40 away from the recess portion 13 and backrest 12, thereby rotating it away from the locked position. It will be appreciated that the size and/or dimensions of the recessed portion 13 is not limited to that shown in the Figures. In another form, the recessed portion could be larger than a user's fingers, in an alternate form, it could be smaller such that a user's fingers would not fit, and instead, the locking member may feature an alternate means to pull the locking member 40 away, such as a hook or strap.

While in the embodiment shown, the clamping member 30 is pivotally attached with respect to the seat portion 11 of the seat body 10, and the locking member 40 is configured to bear against a portion of the backrest portion 12 of the seat body 10, it will be appreciated that the position of the tensioning mechanism 20 may be varied and still fall within the intended scope of this disclosure. For example, the clamping member 30 may be pivotally attached with respect to the backrest portion 12 and the locking member 40 may be configured to bear against a portion of the seat portion 11.

Figure 6:
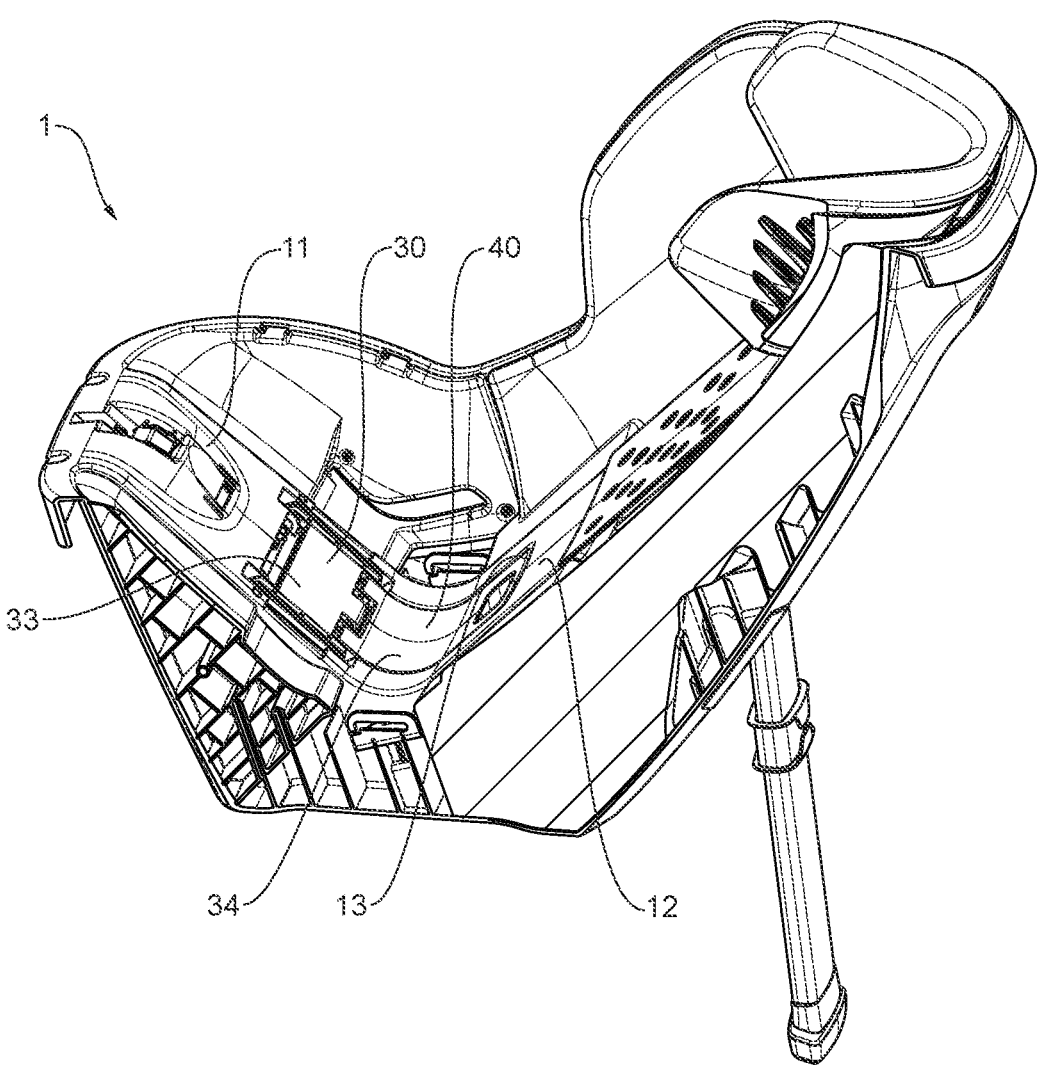
FIG. 6 is a partial perspective view of the child seat of FIG. 1, showing the clamping member in the first position and the locking member locked.

With reference again to FIGS. 6 and 7, it will be appreciated that with the locking member 40 in the locked position, with the stop surface 49 and contact portion 43 of each projection 41 bearing against their respective stop surface 17 and second ramped surface 18 formed in each aperture 14, and the lower surface 48 of the locking member 40 bearing against a portion of the backrest 12, that the clamping 30, locking member 40 and seat body 10 have formed an arrangement where the clamping member 30 is secured in position and cannot be moved away from this position by an external force acting upon it.

It will be appreciated that once locked, any force acting on the clamping member 30 (such as the reaction force from the tension of the belt 2) will transfer through to its first end 31 (which is pivotally connected with respect to the seat body 10 and its second end 32), which then transfers into the first end 45 of the locking member 40, where the first end 45 of the locking member is prevented from being lifted away by virtue of the stop surface 49 and contact portion 43 of each projection 41 bearing against their respective stop surface 17 and second ramped surface 18 formed in each aperture 14, and the lower surface 48 bearing against the backrest 12. It will be appreciated that it is only when the locking member 40 is rotated away from the locked position, that the clamping member 30 can be rotated away from the first position.

It will also be appreciated that this arrangement allows for single handed operation of the tensioning mechanism 20, without the need for the actuation of any additional locking elements. Furthermore, once the locking member 40 is in the locked position, this becomes a clear indication that the clamping member 30 has been locked in place by virtue of the locking member 40 resting within the corresponding recessed portion 13 of the seat body 10.

It will further be appreciated that the clamping member 30 and locking member 40 both provide upper surfaces 33, 45 that match the corresponding contour of the remainder of the continuous seating surface for the occupant, and that the lower surfaces 34, 46 feature a plurality of rib elements and hollow sections to improve the rigidity of the respective members whilst saving weight.

It can be seen that the tensioning mechanism 20 is pivotally attached with respect to the seat body 10 via a hinge member 50, where the hinge member 50 is configured to be rigidly secured to the seat body 10, and the clamping member 30 is configured to be pivotally attached to the hinge member 50 via a hinge pin 51.

Operation of the child seat 1 and tensioning mechanism 20 will now be described with reference to the figures:

To secure the child seat 1 to the vehicle seat using a vehicle seat belt: child seat 1 is positioned on vehicle seat; locking member 40 is unlocked and clamping member 30 is moved to the second position (as shown in FIG. 2); seat belt buckle carrying the shoulder and lap portion of vehicle seat belt 2 is passed through apertures 4 formed in both side wings 3 of the child seat 1, such that the vehicle seat belt 2 lays over the seat body 10; vehicle seat belt 2 is buckled and excess belt is withdrawn; clamping member 30 is moved to the first position, pushing against the vehicle seat belt 2; once at the first position (as shown in FIG. 5) locking member 40 is rotated toward the locked position where its

US 12,606,063 B2

Figure 7:
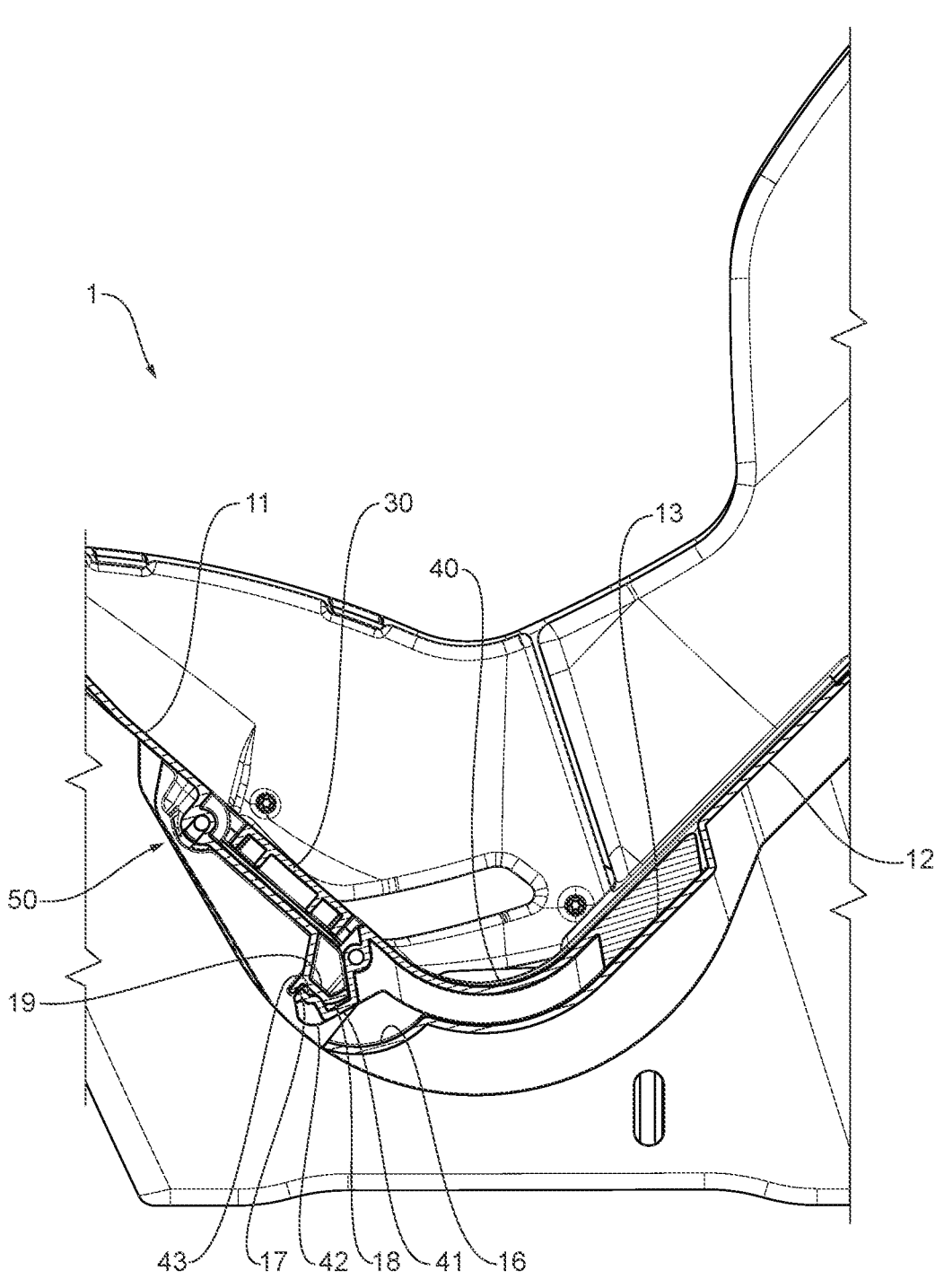
FIG. 7 is a sectional view of the child seat of FIG. 1, showing the clamping member in the first position and the locking member locked.

7 projections 41 bear against stop surfaces provided within respective recesses 13 formed in seat body 10 (as shown in FIG. 7).

To secure the child seat 1 to the vehicle seat using a soft latch system: seat 1 is positioned on vehicle seat; locking member 40 is unlocked and clamping member 30 is moved to the second position (as shown in FIG. 2); anchor latches are passed through respective apertures 4 formed in both side wings 3 of the child seat, such that the soft latch belt 2 lays over the seat body 10; anchor latches are connected to respective anchor points and excess belt is withdrawn; clamping member 30 is moved to the first position, pushing against the soft latch belt 2; once at the first position (as shown in FIG. 5) locking member 40 is rotated toward the locked position where its projections 41 bear against stop surfaces provided within respective recesses 13 formed in seat body 10 (as shown in FIG. 7).

It will be appreciated that as the locking member 40 is rotated to the locked position and the contact portion 43 passes the transition region 21, the locking member 40 may be caused to rotate with sufficient force that an audible "click" will be heard when locking member 40 reaches the locked position and contact is made between two stop surfaces 49, 17 on the projection 41 and aperture 14, as well as the lower surface 48 of the locking member 40 and a portion of the backrest 12. While this "click" sound is not necessarily required, it will be appreciated that it is advantageous for a user to ensure that the locking member 40 has moved to the locked position.

To remove the child seat 1 from the vehicle seat using a vehicle seat belt: locking member 40 is rotated away from the locked position until vehicle seat belt pushes clamping member 30 up; clamping member 30 is moved toward the second position (as shown in FIG. 2); vehicle seat belt 2 is unbuckled and the buckle carrying the shoulder and lap portion of vehicle seat belt 2 passed back through apertures 4 formed in both side wings 3 of the child seat 1; clamping member 30 is returned to first position and locking member 40 is rotated to the locked position; child seat may 1 be removed from vehicle seat.

To remove the child seat 1 from the vehicle seat using a soft latch system: locking member 40 is rotated away from the locked position until the soft latch belt pushes clamping member 30 up; clamping member 30 is moved toward the second position (as shown in FIG. 2); anchor latches are released and passed back through apertures 4 formed in both side wings 3 of the child seat 1; clamping member 30 is returned to first position and locking member 40 is rotated to the locked position; child seat may 1 be removed from vehicle seat.

In this embodiment, this tensioning mechanism 20 is pivotally attached with respect to the seat portion (11) of the seat body (10) and used when child seat 1 is in a rear facing mode. It will however be appreciated that in alternate arrangements, a tensioning mechanism could be pivotally attached with respect to the backrest portion (12). The tensioning mechanism could also be used in a child seat when in a forward facing mode. In yet a further embodiment, a child seat could be provided with more than one tensioning mechanism.

It will be appreciated that there may be some variances between the above described operation, when considering the operation of the tensioning mechanism with alternate child restraints (such as a base for a child seat, or a child seat of an alternate design). For example, the above description contemplates the belt 2 or anchor latches being passed through apertures 4 formed in side wings 3 of the child seat 1, it will however be appreciated that alternate child restraints may not feature apertures for belt or anchor latches to pass through, and this step would not be required.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

In some cases, a single embodiment may, for succinctness and/or to assist in understanding the scope of the disclosure, combine multiple features. It is to be understood that in such a case, these multiple features may be provided separately (in separate embodiments), or in any other suitable combination. Alternatively, where separate features are described in separate embodiments, these separate features may be combined into a single embodiment unless otherwise stated or implied. This also applies to the claims which can be recombined in any combination. That is a claim may be amended to include a feature defined in any other claim. Further a phrase referring to "at least one of" a list of items refers to any combination of those items, including single members. As an example, "at least one of: a, b, or c" is intended to cover: a, b, c, a-b, a-c, b-c, and a-b-c.

It will be appreciated by those skilled in the art that the invention is not restricted in its use to the particular application described. Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

The invention claimed is:

1. A child restraint configured to be secured to a vehicle seat, the child restraint comprising:
   a restraint body configured to receive a belt in an untensioned state; and
   a tensioning mechanism comprising a clamping member pivotally attached with respect to a portion of the restraint body, wherein the clamping member is rotatable between a first position substantially adjacent to the restraint body and a second position displaced therefrom, wherein placing the clamping member in the second position allows the restraint body to receive the belt, and movement of the clamping member from the second position to the first position presses a portion of the clamping member against the belt such that a portion of the belt is displaced by the clamping member to secure the child restraint to the vehicle seat in a tensioned configuration;
   wherein the tensioning mechanism further comprises a locking member pivotally attached with respect to the clamping member, the locking member comprising a pair of projections configured to engage with corresponding apertures formed in the restraint body to secure the clamping member in the first position;
   wherein the restraint body is in the form of a child seat comprising a seat portion and a backrest portion;
   wherein the seat portion includes a front end opposite the backrest portion;

wherein the clamping member is pivotally attached to the seat portion on a first end;

wherein the clamping member is pivotally attached to locking member on a second end;

wherein in the second position the locking member first pivots away from the backrest portion and subsequently the clamping member pivots away from the backrest portion.

2. The child restraint as claimed in claim 1, wherein the clamping member comprises a first end and a second end, wherein the first end of the clamping member is pivotally attached with respect to the restraint body, and the second end is configured to pivotally attach with respect to the locking member.

3. The child restraint as claimed in claim 1, wherein when the clamping member has been moved to its first position, the locking member can be rotated from an unlocked position, toward a locked position, such that projections engage with the corresponding apertures.

4. The child restraint as claimed in claim 3, wherein each projection and aperture comprise a corresponding stop surface, and wherein the locking member will reach the locked position when the stop surface of each projection bears against the corresponding stop surface provided within each aperture.

5. The child restraint as claimed in claim 4 wherein each aperture comprises first and second ramped surfaces separated by a transition region, and wherein each projection comprises a contact portion configured to come into contact with and bear against the first and second ramped surfaces as the locking portion is rotated toward and away from the locked position, wherein the first ramped surface is configured to resist rotation of the locking member as the locking member is rotated toward the locked position and the second ramped surface is configured to resist rotation of the locking member as the locking member is rotated away from the locked position.

6. The child restraint as claimed in claim 1, wherein the clamping member further comprises a first surface and a second surface, wherein when the clamping member is in the first position, the first surface of the clamping member forms a continuous seating surface for an occupant of the child seat, and a portion of the second surface of the clamping member is configured to bear against a portion of the belt.

7. The child restraint as claimed in claim 1, wherein the restraint body is in the form of a seat base configured to receive a child seat.

8. The child restraint as claimed in claim 1, wherein the belt is a vehicle seat belt.

9. The child restraint as claimed in claim 8, wherein the belt comprises a shoulder section and a lap section and movement of the clamping member from the second position to the first position presses a portion of the clamping member against either or both of the shoulder section or the lap section of the belt such that a portion of either or both of the shoulder section or the lap section are displaced by the clamping member.

10. The child restraint as claimed in claim 1, wherein the belt is for a soft latch system.

* * * * *